US012566073B2

(12) United States Patent
Nagata et al.

(10) Patent No.: US 12,566,073 B2
(45) Date of Patent: Mar. 3, 2026

(54) OPERATION MANAGEMENT APPARATUS

(71) Applicant: TOYOTA JIDOSHA KABUSHIKI KAISHA, Toyota (JP)

(72) Inventors: Yu Nagata, Chofu (JP); Tomoyuki Kozuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 153 days.

(21) Appl. No.: 18/386,283

(22) Filed: Nov. 2, 2023

(65) Prior Publication Data

US 2024/0151542 A1 May 9, 2024

(30) Foreign Application Priority Data

Nov. 8, 2022 (JP) ................................. 2022-179129

(51) Int. Cl.
*G01C 21/34* (2006.01)
*B60W 30/14* (2006.01)
(Continued)

(52) U.S. Cl.
CPC ....... *G01C 21/3461* (2013.01); *B60W 30/146* (2013.01); *B60W 40/02* (2013.01);
(Continued)

(58) Field of Classification Search
CPC ..... B60W 2040/0881; B60W 2300/10; B60W 2420/403; B60W 2540/227;
(Continued)

(56) References Cited

U.S. PATENT DOCUMENTS 10,712,160 B2 * 7/2020 Rander ........... B60W 30/18172
11,854,258 B1 * 12/2023 Murphy ................... G06T 7/73
(Continued)

FOREIGN PATENT DOCUMENTS

CN 114502443 A * 5/2022 ............ B60W 40/02
JP 2016-062113 A 4/2016
(Continued)

OTHER PUBLICATIONS

Machine Translation of CN 114502443 A obtained from Clarivate Analytics on Jun. 10, 2025 (Year: 2022).*

*Primary Examiner* — Fadey S. Jabr
*Assistant Examiner* — Michael J Herrera
(74) *Attorney, Agent, or Firm* — Dinsmore & Shohl LLP

(57) ABSTRACT

An operation management apparatus is configured to operate a vehicle by automated driving. The operation management apparatus includes a controller configured to acquire precipitation data indicating the amount of precipitation forecasted to fall during a time period that lasts until operation of the vehicle is completed, perform, using the acquired precipitation data as an input, a determination process to determine an occurrence state of puddles for each of a plurality of candidate links connecting a first node and a second node included in a route along which the vehicle is scheduled to travel, and select a link, from among the candidate links, based on a determination result of the occurrence state of the puddles and determine, as an operation route for the vehicle, a route constituted of the selected link.

3 Claims, 3 Drawing Sheets

(51) Int. Cl.

| | |
|---|---|
| *B60W 40/02* | (2006.01) |
| *B60W 40/08* | (2012.01) |
| *B60W 60/00* | (2020.01) |
| *G01C 21/36* | (2006.01) |
| *G06V 20/59* | (2022.01) |
| *G06V 40/10* | (2022.01) |

(52) U.S. Cl.
CPC ...... *B60W 40/08* (2013.01); *B60W 60/00253* (2020.02); *G01C 21/3691* (2013.01); *G06V 20/593* (2022.01); *G06V 40/10* (2022.01); *B60W 2040/0881* (2013.01); *B60W 2300/10* (2013.01); *B60W 2420/403* (2013.01); *B60W 2540/227* (2020.02); *B60W 2555/20* (2020.02); *B60W 2556/50* (2020.02)

(58) Field of Classification Search
CPC ......... B60W 2555/20; B60W 2556/45; B60W 2556/50; B60W 30/146; B60W 30/18009; B60W 40/02; B60W 40/08; B60W 60/00253; G01C 21/3461; G01C 21/3691; G01S 19/14; G01W 1/14; G06V 20/588; G06V 20/59; G06V 20/593; G06V 40/10; G08G 1/096725; G08G 1/096833
See application file for complete search history.

(56) References Cited

U.S. PATENT DOCUMENTS

| | | | |
|---|---|---|---|
| 2018/0060674 A1* | 3/2018 | Zhao | G06V 10/811 |
| 2019/0018918 A1* | 1/2019 | Wood | G06F 17/18 |
| 2019/0351911 A1* | 11/2019 | Anezaki | B60W 50/14 |
| 2020/0290624 A1* | 9/2020 | Kumano | B60W 60/0011 |
| 2021/0354723 A1* | 11/2021 | McCool | G06V 20/588 |
| 2022/0028277 A1* | 1/2022 | Patnaik | G05D 1/0297 |
| 2022/0097557 A1* | 3/2022 | Lee | B60K 35/10 |
| 2023/0140569 A1* | 5/2023 | Foster | B60W 60/0017 |
| | | | 701/400 |

FOREIGN PATENT DOCUMENTS

| | | |
|---|---|---|
| JP | 2018-062197 A | 4/2018 |
| JP | 2019-098965 A | 6/2019 |
| JP | 2019-152560 A | 9/2019 |

* cited by examiner

OPERATION MANAGEMENT APPARATUS

CROSS-REFERENCE TO RELATED APPLICATION

This application claims priority to Japanese Patent Application No. 2022-179129 filed on Nov. 8, 2022, the entire contents of which are incorporated herein by reference.

TECHNICAL FIELD

The present disclosure relates to an operation management apparatus.

BACKGROUND

Patent Literature (PTL) 1 discloses a travel support apparatus. The travel support apparatus disclosed in PTL 1 calculates a predicted position of a small electric vehicle that is expected to travel with avoiding a puddle in front of an own vehicle, and supports travel of the own vehicle according to the calculated predicted position.

CITATION LIST

Patent Literature

PTL 1: JP 2019-98965 A

SUMMARY

When vehicles pass over puddles, the vehicles tend to splash water onto pedestrians. Also, when vehicles pass over puddles, hydroplaning phenomena tend to occur, which are dangerous.

It would be helpful to reduce danger in travel of vehicles, while preventing splashes of water onto pedestrians.

An operation management apparatus according to the present disclosure is an operation management apparatus configured to operate a vehicle by automated driving, the operation management apparatus including a controller configured to:

acquire precipitation data indicating the amount of precipitation forecasted to fall during a time period that lasts until operation of the vehicle is completed;

perform, using the acquired precipitation data as an input, a determination process to determine an occurrence state of puddles for each of a plurality of candidate links connecting a first node and a second node included in a route along which the vehicle is scheduled to travel; and select a link, from among the candidate links, based on a determination result of the occurrence state of the puddles and determine, as an operation route for the vehicle, a route constituted of the selected link.

According to the present disclosure, danger in travel of vehicles can be reduced, while preventing splashes of water onto pedestrians.

DETAILED DESCRIPTION

Figure 1:
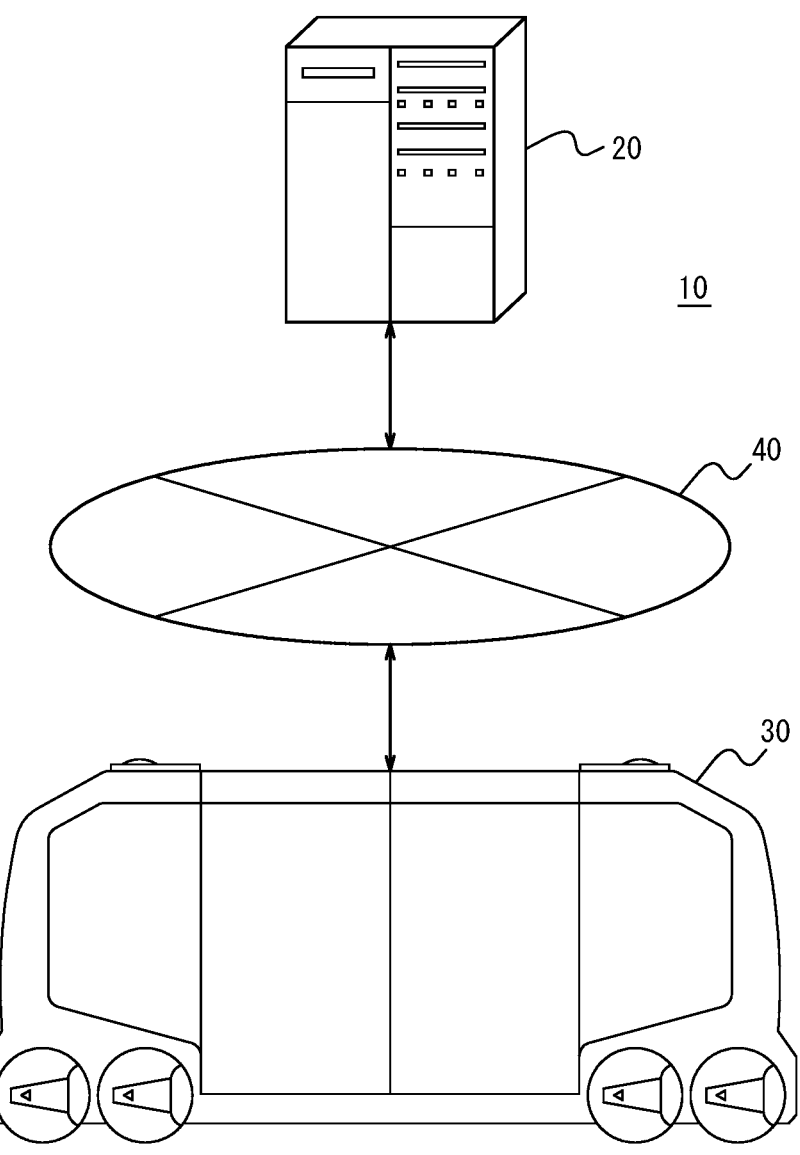
FIG. 1 is a diagram illustrating a configuration of a system according to an embodiment of the present disclosure.

An embodiment of the present disclosure will be described below, with reference to the drawings.

In the drawings, the same or corresponding portions are denoted by the same reference numerals. In the description of the present embodiment, detailed description of the same or corresponding portions is omitted or simplified as appropriate.

A configuration of a system 10 according to the present embodiment will be described with reference to FIG. 1.

The system 10 according to the present embodiment includes an operation management apparatus 20 and at least one vehicle 30. The system 10 is used, for example, to provide a mobility service such as MaaS. The term "MaaS" is an abbreviation of Mobility as a Service.

The operation management apparatus 20 can communicate with the vehicle 30 via a network 40 such as the Internet.

The operation management apparatus 20 is installed in a facility such as a data center and operated by an operation manager who manages the system 10. The operation management apparatus 20 is a computer such as a server that belongs to a cloud computing system or other computing system. The operation management apparatus 20 may be installed in a control room of the system 10 and used by the operation manager. Alternatively, the operation management apparatus 20 installed in the control room may be shared by two or more operation managers. In the present embodiment, the operation management apparatus 20 operates the vehicle 30 along an operation route by automated driving.

The vehicle 30 is, for example, any type of automobile such as a gasoline vehicle, a diesel vehicle, a hydrogen vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. The vehicle 30 is a MaaS dedicated vehicle in the present embodiment, but may be an AV the driving of which is automated at any level. The term "AV" is an abbreviation of autonomous vehicle. The automation level is, for example, any one of Level 1 to Level 5 according to the level classification defined by SAE. The name "SAE" is an abbreviation of Society of Automotive Engineers.

The network 40 includes the Internet, at least one WAN, at least one MAN, or a combination thereof. The term "WAN" is an abbreviation of wide area network. The term "MAN" is an abbreviation of metropolitan area network. The network 40 may include at least one wireless network, at least one optical network, or a combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIG. 1.

In the system 10, the operation management apparatus 20 functions as a mobility service platform. As an overview, the operation management apparatus 20 determines an operation route R for the vehicle 30 and operates the vehicle 30 along the determined operation route R by automated driving.

In the present embodiment, the vehicle 30 is a bus that transports one or more passengers. The vehicle 30 is operated as a regular operation bus that travels by automated driving according to a predetermined schedule. A control apparatus is mounted in the vehicle 30. The control apparatus performs vehicle control based on commands from the operation management apparatus 20. For example, the control apparatus controls the operations of the vehicle 30 based on information indicating the operation route R determined by the operation management apparatus 20. As a result, the vehicle 30 travels along the operation route R. The operation route R includes, for example, a start point P1 where the vehicle 30 starts traveling and an end point P2 where the vehicle ends traveling.

When puddles occur on the operation route R along which the vehicle travels due to rain, etc., if the vehicle 30 passes through a puddle, the water splashes as the vehicle 30 passes through the puddle, and the splashed water may splash pedestrians. It is also dangerous for driving for the vehicle 30 to pass through locations where the puddles have occurred. Furthermore, it is time-consuming and labor-intensive to work around the puddles while the vehicle 30 is in operation. Therefore, it is desirable to determine a route with as few puddles as possible as the operation route R.

In the present embodiment, the operation management apparatus 20 operates the vehicle 30 by automated driving. The operation management apparatus 20 acquires precipitation data D1, which indicates the amount of precipitation forecasted to fall during a time period that lasts until operation of the vehicle 30 is completed. Using the acquired precipitation data D1 as input, the operation management apparatus 20 performs a determination process to determine the occurrence state of puddles for each of a plurality of candidate links L1, L2, L3, Ln connecting the first node N1 and the second node N2 included in the route on which the vehicle 30 is scheduled to travel. In the present embodiment, the first node N1 and the second node N2 are selected from two or more nodes N included in the route on which the vehicle is scheduled to travel. The operation management apparatus 20 selects a link L' from the candidate links L1, L2, L3, Ln based on the determination result of the occurrence state of the puddles, and determines the route R' constituted of the selected link L' as the operation route R for the vehicle 30.

According to the present embodiment, the locations where puddles occur are predicted based on the amount of precipitation forecasted to fall during the operation of the vehicle 30, and the operation route R is determined based on the predicted results. For example, route R', which has fewer puddles that could occur, is selected as the operation route R, so that pedestrians are less likely to be splashed. It also reduces danger in travel of the vehicle 30. Furthermore, the time and effort required to avoid puddles while the vehicle is in operation is reduced.

Figure 2:
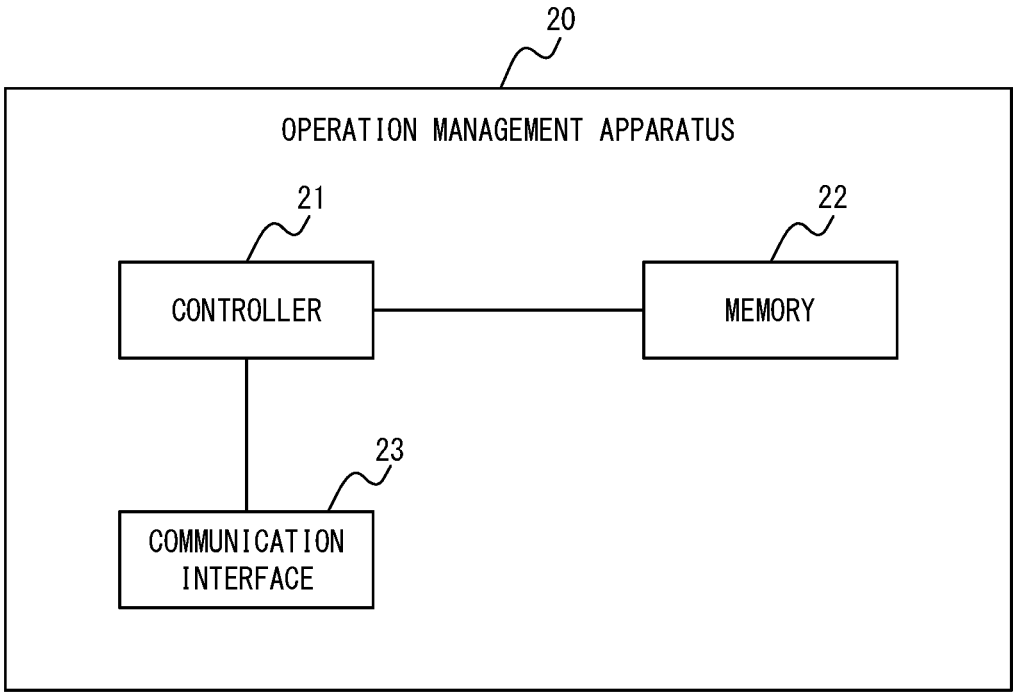
FIG. 2 is a block diagram illustrating a configuration of an operation management apparatus according to an embodiment of the present disclosure.

A configuration of the operation management apparatus 20 according to the present embodiment will be described with reference to FIG. 2.

The operation management apparatus 20 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 21 executes processes related to operations of the operation management apparatus 20 while controlling components of the operation management apparatus 20.

The memory 22 includes at least one semiconductor memory, at least one magnetic memory, at least one optical memory, or any combination thereof. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores data to be used for the operations of the operation management apparatus 20 and data obtained by the operations of the operation management apparatus 20. In the present embodiment, the memory 22 stores the precipitation data D1, for example. The precipitation data D1 includes data indicating the amount of precipitation forecasted to fall during the time period that lasts until operation of the vehicle 30 is completed.

The communication interface 23 includes at least one interface for communication. The interface for communication is, for example, a LAN interface. The communication interface 23 receives data to be used for the operations of the operation management apparatus 20, and transmits data obtained by the operations of the operation management apparatus 20. In the present embodiment, the communication interface 23 communicates with the vehicle 30.

The functions of the operation management apparatus 20 are realized by execution of a program according to the present embodiment by a processor serving as the controller 21. That is, the functions of the operation management apparatus 20 are realized by software. The program causes a computer to execute the operations of the operation management apparatus 20, thereby causing the computer to function as the operation management apparatus 20. That is, the computer executes the operations of the operation management apparatus 20 in accordance with the program to thereby function as the operation management apparatus 20.

The program can be stored in a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM in which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, the program stored in the portable medium or the program transferred from the server. Then, the computer reads the program stored in the main memory using a processor, and executes processes in accordance with the read program using the processor. The computer may read the program directly from the portable medium, and execute processes in accordance with the program. The computer may, each time a program is transferred from the server to the computer, sequentially execute processes in accordance with the received program. Instead of transferring the program from the server to the computer, processes may be executed by a so-called ASP type service that realizes functions only by execution instructions and result acquisitions. The term "ASP" is an abbreviation of application service provider. The program encompasses information that is to be used for processing by an electronic computer and is thus equivalent to a program. For example, data that is not a direct command to a computer but has a property that regulates processing of the computer is "equivalent to a program" in this context.

Some or all of the functions of the operation management apparatus 20 may be realized by a programmable circuit or a dedicated circuit serving as the controller 21. That is, some or all of the functions of the operation management apparatus 20 may be realized by hardware.

Figure 3:
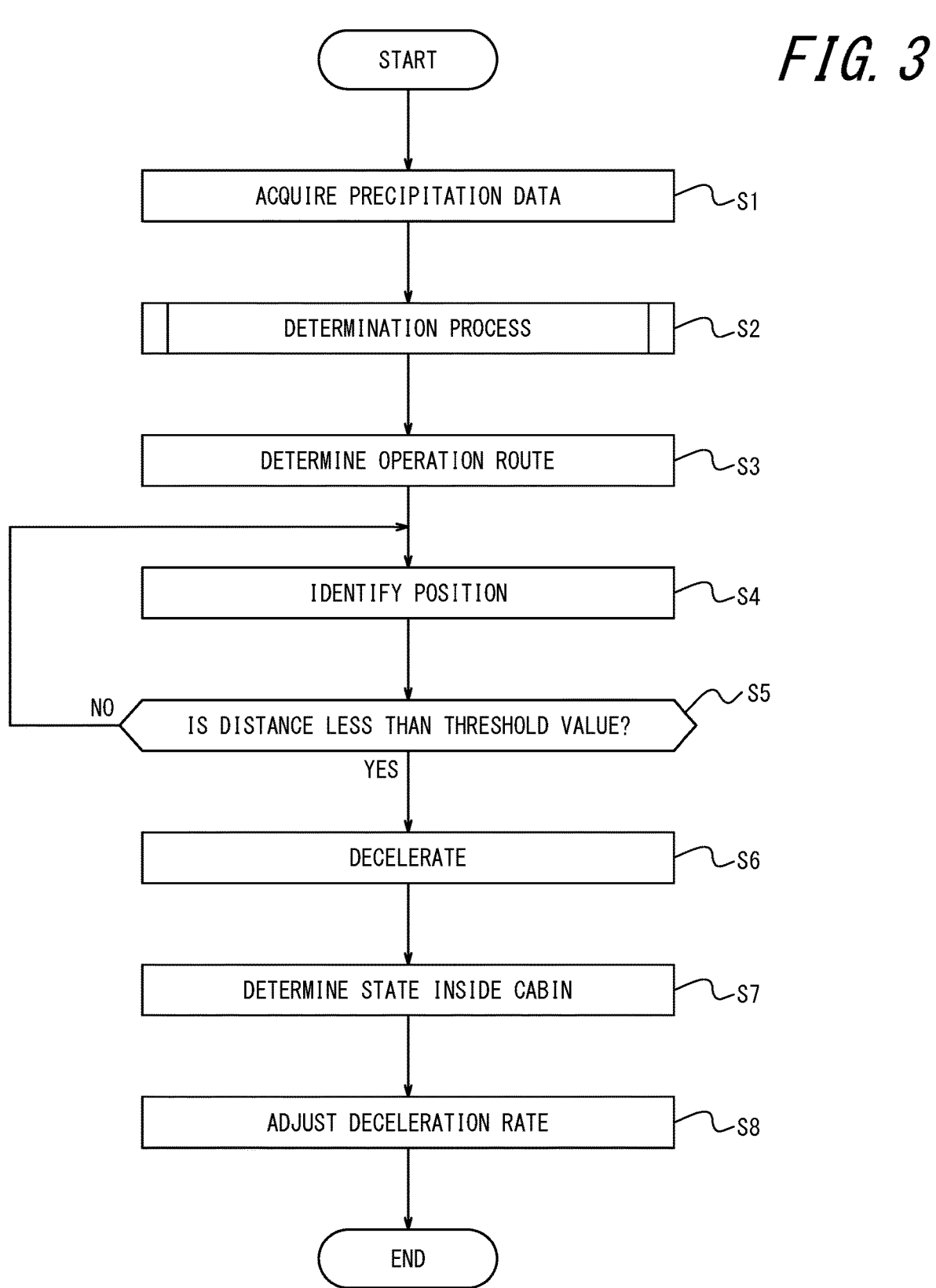
FIG. 3 is a flowchart illustrating operations of the operation management apparatus according to an embodiment of the present disclosure.

Operations of the operation management apparatus 20 according to the present embodiment will be described with reference to FIG. 3. The operations correspond to an operation management method according to the present embodiment.

In step S1, the controller 21 of the operation management apparatus 20 acquires precipitation data D1, which indicates the amount of precipitation forecasted to fall during the time period that lasts until operation of the vehicle is completed. The precipitation data D1 may be acquired by any procedure. In the present embodiment, for example, the controller 21 acquires precipitation data D1 that has been previously registered in the memory 22. The precipitation data D1 is data indicating the amount of precipitation forecasted based on weather forecast data. The weather forecast data is provided by, for example, the Japan Meteorological Agency. Alternatively, the weather forecast data may be provided by other devices connected to the network 40.

In step S2, the controller 21 of the operation management apparatus 20 executes a determination process to determine the occurrence state of puddles, using the precipitation data D1 acquired in step S1 as an input. Specifically, the controller 21 performs a determination process for each of a plurality of candidate links L1, L2, L3, . . . , Ln connecting the first node N1 and the second node N2, which are selected from two or more nodes N in the route on which the vehicle 30 is scheduled to travel. In the present embodiment, the first node N1 is the start point P1 where the vehicle 30 starts traveling. The second node N2 is the end point P2 where the vehicle 30 ends its travel. Two or more nodes N may include an intermediate point P3 between the start point P1 and the end point P2. The intermediate point P3 is, for example, the stop through which the vehicle 30 passes. Then, instead of using the second node N2 as the end point P2, the second node N2 may be used as the intermediate point P3. Alternatively, instead of using the first node N1 as the start point P1, the first node N1 may be used as the intermediate point P3.

In the present embodiment, the controller 21 of the operation management apparatus 20 performs, as the determination process, a process that uses a machine-learned model to identify the positions of puddles that occur. Specifically, the controller 21 performs, as the determination process, a process using a machine-learned model that takes data indicating the amount of precipitation as an input and data indicating the occurrence positions of the puddles as an output corresponding to the amount of precipitation. The controller 21 inputs the precipitation data D1 acquired in step S1 into the machine-learned model for determining the positions of puddles to occur, and acquires a determination result of the positions of the puddles from the machine-learned model. The machine-learned model may be generated by any machine learning method; however, in the present embodiment, the following machine learning method is used.

In a first step, the controller 21 of the operation management apparatus detects puddles. Specifically, the controller 21 detects puddles based on captured images M of a road surface of each of the plurality of candidate links L1, L2, L3, . . . , Ln. The captured images M may be acquired by any appropriate procedure, such as the following procedure. The communication interface 23 of the operation management apparatus 20 receives one or more images acquired by photographing the road surfaces using imaging devices such as a driving recorders mounted on any plurality of vehicles VH under the control of the operation management apparatus 20. The controller 21 acquires the images received by the communication interface 23. The plurality of vehicles VH may include the vehicle 30. The captured images M may be images captured by driving recorder translogs, roadside units, or fixed-point cameras. Alternatively, the captured images M may be still images captured from videos. The controller 21 of the operation management apparatus 20 detects puddles by analyzing the one or more acquired images M to identify the occurrence positions of the puddles.

Alternatively, the controller 21 of the operation management apparatus may measure the size of the puddle when detecting the puddle. The size of a puddle is, for example, the diameter of the puddle. The controller 21 may then identify the occurrence positions of the puddles where the measured size is greater than or equal to the threshold value Th1. The threshold value Th1 can be any value, but is set, for example, as follows: the amount of water splashed when the vehicle 30 passes over said puddle is expected to increase in proportion to the size of the puddle. In other words, if the puddle is small enough, it is likely that the vehicle 30 will pass over the puddle with little or no splash, or if splash does occur, it will be unlikely to hit pedestrians. Therefore, the threshold value Th1 should be the diameter of the puddle, a value that is considered unlikely to cause a splash large enough to hit a pedestrian even if the vehicle 30 passes by. As an example, the threshold value Th1 can be about 100 cm. Alternatively, the danger of the vehicle 30 passing over the puddle is considered to increase in proportion to the size of the puddle. Therefore, the threshold value Th1 may be used as the diameter of the puddle, a value that is considered unlikely to cause hydroplane phenomena even if the vehicle 30 passes through it.

In a second step, the controller 21 of the operation management apparatus 20 creates teacher data. Specifically, for each puddle detected in the first step, the controller 21 creates teacher data by mapping the amount of precipitation observed when the puddle is detected and the occurrence position of the detected puddle. Specifically, the controller 21 maps, for example, the occurrence position of the puddle identified in the first step together with the amount of precipitation observed when the puddle is detected, thereby mapping the amount of precipitation to the occurrence position of the puddle.

The amount of precipitation observed when a puddle is detected may be determined by any appropriate procedure, such as the following procedure. Precipitation sensors mounted on or connected to each vehicle VH observe rain and other precipitation. The data observed by the precipitation sensor is transmitted from each vehicle VH to the operation management apparatus 20. The communication interface 23 of the operation management apparatus 20 receives the data transmitted from each vehicle VH. The controller 21 of the operation management apparatus 20 acquires the data received by the communication interface 23. The controller 21 determines the amount of precipitation based on the acquired data. As an alternative, the controller 21 of the operation management apparatus 20 may, for example, acquire historical weather data provided by the Japan Meteorological Agency and determine the amount of precipitation observed when the puddle was detected based on the acquired historical weather data. Alternatively, weather data may be provided by other devices connected to the network 40.

The following is a specific procedure for creating teacher data. As an example, suppose a puddle X, a puddle Y, and a puddle Z are detected in the first step described above. Specifically, suppose that the occurrence position Px of the puddle X, the occurrence position Py of the puddle Y, and the occurrence position Pz of the puddle Z are identified. Suppose that in the second step above, the amount of precipitation determined for puddle X is 10 mm, the amount of precipitation determined for puddle Y is 20 mm, and the amount of precipitation determined for puddle Z is 1 mm. The controller 21 of the operation management apparatus 20 maps an amount of precipitation of 10 mm to the occurrence position Px of the puddle X. The controller 21 maps an amount of precipitation of 20 mm to the occurrence position Py of the puddle Y. The controller 21 maps an amount of precipitation of 1 mm to the occurrence position Pz of the puddle Z.

In a third step, a machine-learned model is generated. Specifically, machine learning is performed using the teacher data created in the second step to generate a machine-learned model with data indicating the amount of precipitation as an input and data indicating the occurrence positions of puddles corresponding to the amount of precipitation indicated by the input data as an output. Machine learning can be performed by known machine learning algorithms, such as neural networks or deep learning.

In the present embodiment, the machine-learned model outputs puddle data D2, which indicates the occurrence positions of the puddles corresponding to the input amount of precipitation, as a determination result. The puddle data D2 is data indicating the occurrence positions of the puddles in coordinates such as latitude and longitude. As an example, if the machine-learned model is created using the teacher data described above, for example, when an amount of precipitation of 10 mm is input, data indicating the occurrence position Px is output as puddle data D2. The controller 21 of the operation management apparatus 20 acquires, as a determination result, the puddle data D2 output by the machine-learned model as a result of the determination process in step S2.

In step S3, the controller 21 of the operation management apparatus 20 determines the operation route R of the vehicle 30 based on the determination result of the occurrence state of the puddles. Specifically, controller 21 selects link L' from candidate links L1, L2, L3, . . . , Ln based on the puddle data D2 acquired as a determination result in step S2. The controller 21 then determines the route R' constituted of the selected link L' as the operation route R of the vehicle 30. In the present embodiment, controller 21 identifies the occurrence positions of the puddles for each candidate link by referring to puddle data D2 acquired in step S2. The controller 21 then selects a link with a fewest number of the occurrence positions of the puddles identified, from among the candidate links L1, L2, L3, . . . , Ln as link L'. The controller 21 determines the route R' constituted of the selected link L' as the operation route R of the vehicle 30.

As described above, the operation management apparatus 20 for the present embodiment acquires precipitation data D1, which indicates the amount of precipitation forecasted to fall during the time period that lasts until operation of the vehicle 30 is completed. The operation management apparatus takes the acquired precipitation data D1 as an input and performs a determination process to determine the occurrence state of puddles for each of a plurality of candidate links L1, L2, L3, . . . , Ln connecting a first node N1 and a second node N2 selected from two or more nodes N included in the route on which the vehicle 30 is scheduled to travel. The operation management apparatus 20 selects a link L' from the candidate links L1, L2, L3, . . . , Ln based on the determination result of the occurrence state of the puddles, and determines the route R' constituted of the selected link L' as the operation route R for the vehicle 30.

According to such a configuration, the locations where puddles occur are predicted based on the amount of precipitation forecasted to fall during the operation of the vehicle 30, and the operation route R is determined based on the predicted results. For example, route R', which has a fewest number of puddles predicted to occur, is selected as the operation route R. As a result, the number of times the vehicle 30 passes through puddled areas during its operation can be reduced. Thus, pedestrians are less likely to be splashed and danger in travel of vehicles is reduced. Furthermore, the time and effort required to avoid puddles while the vehicle 30 is in operation is reduced.

In the embodiment described above, the controller 21 of the operation management apparatus 20 may, after the operation of the vehicle 30 has started, acquire the position data D3 indicating the position of the vehicle 30, identify the respective occurrence positions of the puddles on the operation route R based on the puddle data D2, and control the vehicle 30 to decelerate when the distance d from the position indicated by the position data D3 to any of the identified occurrence positions of the puddles is determined to be less than the threshold value Th2. Specifically, controller 21 may further process steps S4 through S6 below.

In step S4, the controller 21 of the operation management apparatus 20 acquires position data D3 indicating the position of the vehicle 30. The position data D3 may be acquired by any procedure, such as the following procedure. The controller 21 receives, from the vehicle 30 via the communication interface 23, data that indicates a position measured by a positioning sensor provided in the vehicle 30. The positioning sensor includes at least one GNSS receiver. GNSS is, for example, GPS, QZSS, BeiDou, GLONASS, or Galileo. The term "GNSS" is an abbreviation of global navigation satellite system. The term "GPS" is an abbreviation of Global Positioning System. The term "QZSS" is an abbreviation of Quasi-Zenith Satellite System. QZSS satellites are called quasi-zenith satellites. The term "GLONASS" is an abbreviation of Global Navigation Satellite System.

In step S5, the controller 21 of the operation management apparatus 20 identifies the occurrence positions of puddles on the operation route R based on the puddle data D2 acquired as a determination result in step S2 above. As an example, suppose that a puddle X occurs on the operation route R. The controller 21 identifies the occurrence position Px of the puddle X based on the puddle data D2. The controller 21 measures the distance d from the position of the vehicle 30 indicated by the position data D3 acquired in step S4 to the occurrence position Px, and determines whether the measured distance d is less than the threshold value Th2. The threshold value Th2 can be any value, but can be, for example, a braking distance that allows the vehicle 30 to decelerate without braking suddenly to a speed V1 where the pedestrian is not splashed by the splashing water as it passes through the puddle. The speed V1 is, for example, around 10 km/h. If there are two or more occurrence positions of puddles on the operation route R, the controller 21 performs the same process for each puddle. In a case in which it is determined in step S5 that the distance d is less than the threshold value Th2, the process of step S6 is performed. If it is determined in step S5 that the distance d is greater than or equal to the threshold value Th2, the controller 21 returns to step S4 and acquires again the position data D3 indicating the position of the vehicle 30, and the process of step S5 is performed again.

In step S6, the controller 21 of the operation management apparatus 20 controls the vehicle 30 to decelerate. Specifically, controller 21 communicates with the control apparatus unit mounted on vehicle 30 via communication interface 23 to send deceleration commands to the control apparatus. The control apparatus decelerates the vehicle 30 by activating the brakes of the vehicle 30 based on the deceleration command from the operation management apparatus 20. In the present embodiment, it is desirable to decelerate so that the travel speed when passing through an occurrence location of a puddle is, for example, around 10 km/h.

Thus, by reducing the speed of the vehicle 30 as it passes through the occurrence location of the puddle, the splashes of water as the vehicle 30 passes through the occurrence location of the puddle can be made smaller than when the vehicle 30 is not decelerated. In addition, hydroplaning and other phenomena are less likely to occur when the vehicle 30 travels through the occurrence location of the puddle. With this configuration, danger in travel of vehicles can be reduced, while preventing splashes of water onto pedestrians.

In the embodiment described above, the controller 21 of the operation management apparatus 20 may adjust a deceleration rate W of the vehicle 30 according to a state inside a cabin of the vehicle 30 when controlling the deceleration of the vehicle 30 in step S6 described above. Specifically, the controller 21 may further perform the following processes of steps S7 and S8.

In step S7, the controller 21 of the operation management apparatus 20 determines the state inside the cabin of the vehicle 30. Specifically, controller 21 acquires vehicle data D4, which indicates the state inside the cabin of the vehicle 30, and determines the state inside the cabin of the vehicle 30 based on the state indicated by the acquired vehicle data D4. The vehicle data D4 may be acquired by any appropriate procedure, such as the following procedure. A camera or other arbitrary sensor installed in the cabin of the vehicle 30 captures images inside the cabin. The images taken by the sensor are transmitted from the vehicle 30 to the operation management apparatus 20. The controller 21 of the operation management apparatus 20 receives the images transmitted from the vehicle 30 via the communication interface 23. The controller 21 acquires the information obtained by analyzing the received images as vehicle data D4. In the present embodiment, the controller 21 determines the congestion in the cabin of the vehicle 30 as the state inside the cabin of the vehicle. Specifically, controller 21 determines whether any of the passengers in vehicle 30 are standing. In addition, the controller 21 may determine, for example, as the state inside the vehicle 30, whether there is a person holding a stroller, a person in a wheelchair, or a person with a large package or cane.

In step S8, the controller 21 of the operation management apparatus 20 performs control to adjust the deceleration rate W according to the state determined in step S7. Specifically, if it is determined in step S7 that there is a person standing, controller 21 controls the deceleration rate W to be smaller. This is because the larger the deceleration rate W, the greater the sway of the vehicle 30, and if there are people standing, there is a risk of accidents, such as falling over, for example. If the deceleration rate W is large, there is also a risk of vehicle 30 slipping due to sudden deceleration. The deceleration rate W should be less than 20 km, for example. The controller 21 may further count the number of people standing in step S7, and the higher the number counted, the further the deceleration rate W may be reduced. Such a configuration can improve passenger safety, while reducing danger in travel of vehicles and preventing splashes of water onto pedestrians.

The present disclosure is not limited to the embodiment described above. For example, two or more blocks described in the block diagrams may be integrated, or a block may be divided. Instead of executing two or more steps described in the flowchart in chronological order in accordance with the description, the steps may be executed in parallel or in a different order according to the processing capability of the apparatus that executes each step, or as required. Other modifications can be made without departing from the spirit of the present disclosure.

The invention claimed is:

1. An operation management apparatus configured to operate a vehicle by automated driving, the operation management apparatus comprising a controller configured to:
   acquire precipitation data indicating an amount of precipitation forecasted to fall during a time period that lasts until operation of the vehicle is completed;
   acquire one or more images of road surfaces;
   detect puddles by analyzing the one or more images to identify occurrence positions of the puddles when a measured size of a puddle is greater than or equal to a predetermined threshold value;
   for each puddle identified, map an amount of precipitation observed when the puddle is detected and the occurrence position of the detected puddle to create training data;
   perform, using the acquired training data, a determination process to determine an occurrence state of puddles for each of a plurality of candidate links connecting a first node and a second node included in a route along which the vehicle is scheduled to travel;
   select a link, from among the candidate links, based on a determination result of the occurrence state of the puddles and determine, as an operation route for the vehicle, a route constituted of the selected link;
   perform, as the determination process, a process using a machine-learned model that uses data indicating the amount of precipitation as an input and data indicating occurrence position of the puddles corresponding to the amount of precipitation as an output, and acquire, as the determination result, puddle data output from the machine-learned model, the puddle data indicating the occurrence position of the puddles; and after the operation of the vehicle has been started, acquire position data indicating a position of the vehicle, identify, based on the puddle data, the respective occurrence positions of the puddles on the operation route, and in a case in which it is determined that a distance from the position indicated by the position data to any of the occurrence positions is less than a threshold value, control the vehicle to decelerate.

2. The operation management apparatus according to claim 1, wherein the first node is a start point at which the vehicle starts traveling, and the second node is an end point at which the vehicle ends traveling, and the controller is configured to select, with reference to the puddle data, a link with a fewest number of the occurrence positions of the puddles, from among the candidate links.

3. The operation management apparatus according to claim 1, wherein the controller is configured to, when controlling the vehicle to decelerate, further acquire vehicle data indicating a state inside a cabin of the vehicle and adjust a deceleration rate of the vehicle according to the state indicated by the acquired vehicle data.

* * * * *